United States Patent [19]
Chou et al.

[11] Patent Number: 6,064,038
[45] Date of Patent: May 16, 2000

[54] HAND-HELD ELECTRIC SEALER WITH DETACHABLE HEAT RESISTANT COVER SHEET

[75] Inventors: Ammy Chou; Richard Chang, both of Taipei Hsien, Taiwan; Mario B. Accumanno, East Hanover, N.J.

[73] Assignee: Welcome Company, Ltd., Taiwan

[21] Appl. No.: 09/132,687

[22] Filed: Aug. 12, 1998

[51] Int. Cl.[7] .................................................. H05B 1/00
[52] U.S. Cl. ............................................ 219/233; 219/227
[58] Field of Search .................................. 219/233, 227, 219/243, 229, 201, 56.1; 100/139; 101/31; 156/379.6

[56] References Cited

U.S. PATENT DOCUMENTS

| | | |
|---|---|---|
| Re. 8,282 | 6/1878 | Eaton . |
| 1,083,386 | 1/1914 | Chapman . |
| 1,656,690 | 1/1928 | Blackburn . |
| 1,850,280 | 3/1932 | Haynes . |
| 2,371,438 | 3/1945 | Gilliver ............................................ 219/4 |
| 2,465,722 | 3/1949 | Hamilton ........................................ 173/273 |
| 2,669,642 | 11/1954 | Menges . |
| 2,974,717 | 3/1961 | Lindsay ........................................ 154/42 |
| 3,106,630 | 10/1963 | Klamp ........................................ 100/319 |
| 3,319,047 | 5/1967 | Jones, Jr. et al. ........................ 219/388 |
| 3,381,450 | 5/1968 | Monks ........................................ 53/390 |
| 3,408,478 | 10/1968 | Penn ........................................ 219/229 |
| 3,624,349 | 11/1971 | Mayer ........................................ 219/243 |
| 3,660,959 | 5/1972 | La Fleur ........................................ 53/14 |
| 3,752,017 | 8/1973 | Lloyd et al. ............................ 81/9.5 B |
| 4,212,311 | 7/1980 | Del Valle ............................ 132/31 A |
| 4,213,560 | 7/1980 | Weiner ........................................ 219/201 |
| 4,247,753 | 1/1981 | Jaronen ........................................ 219/201 |
| 4,438,323 | 3/1984 | Millnes ........................................ 219/243 |
| 4,561,925 | 12/1985 | Skerjance et al. ................ 156/379.6 |
| 5,142,123 | 8/1992 | Chou ........................................ 219/243 |
| 5,374,806 | 12/1994 | Chou ........................................ 219/229 |
| 5,641,418 | 6/1997 | Chou ........................................ 219/229 |
| 5,854,466 | 12/1998 | Chou ........................................ 219/227 |

FOREIGN PATENT DOCUMENTS

| | | |
|---|---|---|
| 969962 | 12/1950 | France ............................................ 5/5 |
| 542359 | 8/1959 | Netherlands . |
| 040687 | 4/1988 | Taiwan . |
| 75203282 | 7/1988 | Taiwan . |

*Primary Examiner*—Teresa Walberg
*Assistant Examiner*—Quang Van
*Attorney, Agent, or Firm*—Jeffer, Mangels, Butler & Marmaro LLP

[57] ABSTRACT

An electric sealer including a housing, a heating unit mounted in the housing, a frame having an opening extending over at least a portion of the heating unit and a heat resistant cover sheet extending over at least a portion of the opening in the frame.

24 Claims, 5 Drawing Sheets

HAND-HELD ELECTRIC SEALER WITH DETACHABLE HEAT RESISTANT COVER SHEET

This is a continuation-in-part of application Ser. No. 08/917,358 filed on Aug. 26, 1997, now U.S. Pat. No. 5,854,466.

FIELD OF THE INVENTION

The present invention relates to an electric sealing apparatus, and more particularly to a hand-held electrical sealer having a detachable heat resistant cover sheet to protect the electric heating wire

BACKGROUND OF THE INVENTION

A variety of hand-held electric sealing devices have been disclosed, and have appeared on the market. Examples of such devices are seen in Chinese Utility Pat. No. 91041 entitled "Improved Structure of Sealer", and U.S. Pat. No. 5,142,123 entitled "Electric Sealer Energizable by Internal Battery Set or External AC Adapter."

These electrical sealing devices commonly include a housing, a heating unit mounted in the housing, and a press unit pivotally attached to the housing that acts against the heating unit. The heating unit includes an electric heating wire. When an electric current passes through the electric heating wire, the electric heating wire produces heat for sealing plastic bags. In order to protect the electric heating wire against melted plastic material, a heat resistant cover sheet is covered over the electric heating wire. Because the heat resistant cover sheet is not replaceable, the entire electric sealing device can be rendered useless if the heat resistant cover sheet is damaged.

A need exists for an electric heat sealer that eliminates the aforesaid problem, is hand-held and safe to use.

SUMMARY OF THE PREFERRED EMBODIMENTS

In accordance with one aspect of the present invention, there is provided a hand-held electrical sealer including a housing, a heating unit mounted in the housing, a heat resistant cover sheet, and a press unit pivotally connected to the housing and acting against the heating unit. The heating unit includes a heat insulative base having a protrusive portion and an electric heating wire mounted on the protrusive portion of the heat insulative base. The heat resistant cover sheet is stretched within a frame and covers at least a portion of the electric heating wire. The frame includes retainer means that engage the protrusive portion of the heat insulative base to secure the heat resistant cover sheet to the cover portion.

According to another aspect of the present invention there is provided a handheld electric sealer including a housing, a heating unit mounted in the housing, a heat resistant cover sheet and a press unit pivotally connected to the housing and acting against the heating unit. The heating unit includes a heat insulative base having a protrusive portion, and an electric heating wire mounted on the protrusive portion of the heat insulative base. The heat resistant cover sheet covers at least a portion of the electric heating wire, and is held within a frame that includes retainer means that engage the housing and secure the heat resistant cover sheet over the protrusive portion and at least the portion of the electric heating wire.

In a preferred embodiment, the heat resistant cover sheet is a meshed member made from TEFLON® or like material.

Preferably, the electric heating wire of the heating unit is energizable by an internal battery set, an external AC adapter or a combination of the two.

In preferred embodiments, the heat resistant cover sheet and the frame are fastened together by directly adhering the heat resistant cover sheet to the frame, directly molding the frame on the heat resistant cover sheet, or securing the heat resistant cover sheet to the frame in between an upper frame shell and bottom frame shell on the frame.

Because the heat resistant cover sheet is fastened to the frame and the frame is detachably fastened to the heating unit or the housing, the heat resistant cover sheet is replaceable when damaged.

In accordance with yet another aspect of the present invention there is provided a hand-held electric sealer including a housing, a heating unit mounted within the housing, a frame, a heat resistant cover sheet, and a press unit pivotally connected to the housing. The heating unit includes a heat insulative base and an electric heating wire secured to the heat insulative base. The heat resistant cover sheet is removably secured to the heat insulative base by the frame.

In accordance with a further aspect of the present invention there is provided a hand-held electric sealer including a housing, a heating unit mounted within the housing, a frame, a heat resistant cover sheet, and a press unit pivotally connected to the housing. The heating unit includes a heat insulative base and an electric heating wire secured to the heat insulative base. The heat resistant cover sheet is removably secured to the housing by the frame and is aligned with at least a portion of the heating unit.

According to still another aspect of the present invention there is provided an electric sealer including a housing, a heating unit mounted within the housing, a frame, and a heat resistant cover sheet. The frame has defined therein an opening having an edge. The opening is aligned with at least a portion of the heating unit. The heat resistant is aligned with at least a portion of the opening in the frame.

In a preferred embodiment, the electric sealer is a hand-held electric sealer, more specifically a pen-shaped electric sealer.

In additional preferred embodiments, each of the foregoing electrical sealers includes a plurality of electric heating wires secured to the heat insulative base of the heating unit.

According to yet another aspect of the present invention, there is provided a frame for securing a heat resistant cover sheet to a heating unit of an electric sealer. The frame has defined therein an opening that aligns with at least a portion of the heating unit, and includes retainer means for engaging a portion of the heating unit and securing the heat resistant cover sheet between the frame and the portion of the heating unit aligned with the opening.

According to an additional aspect of the present invention, there is provided a frame for securing a heat resistant cover sheet to a heating unit of an electric sealer, particularly adapted for a heating unit that includes retainer means for engaging the frame. The frame has defined therein an opening which aligns with at least a portion of the heating unit, and is adapted to engage the retainer means of the heating unit and secure the heat resistant cover sheet between the frame and the portion of the heating unit aligned with the opening.

According to another aspect of the present invention, there is provided a heat sealing kit including a sealer as described herein and at least one additional heat resistant cover sheet.

In accordance with still another aspect of the present invention, there is provided a method of servicing an electric sealer as described herein, the sealer including a housing, a heating unit mounted within the housing, a frame having defined therein an opening having an edge, the opening being aligned with at least a portion of the heating unit, and a heat resistant cover sheet aligned with at least a portion of the opening in the frame. The method comprising the steps of: removing the frame from the sealer; replacing the heat resistant cover sheet with another heat resistant cover sheet; and returning the frame to said sealer. The replacement heat resistant cover sheet is thus secured in the sealer, and the sealer is again ready for use.

According to yet another aspect of the present invention, there is provided a method of servicing an electric sealer that includes a heating unit and a heat resistant cover sheet secured thereto. The method includes the steps of: removing the heat resistant cover sheet from the heating unit; and replacing the cover sheet so removed with another heat resistant cover sheet.

In accordance with a further aspect of the present invention, there is provided an electric sealer including a heat insulative base, an electric heating wire secured to the heat insulative base, a frame removably secured to the insulative base, and a heat resistant cover sheet disposed between the frame and the electric heating wire.

According to yet a further aspect of the present invention, there is provided a frame for removably securing a heat resistant cover sheet to a heating unit of an electric sealer. The frame includes a top portion having an opening defined therein, said opening being adapted to align with at least a portion of said heating unit, and retainer means connected to the top portion for engaging the heating unit.

In a preferred embodiment of the inventive frame, a heat resistant cover sheet is affixed to the top portion of the frame.

According to still a further aspect of the present invention, there is provided a meshed TEFLON® sheet or other similar material adapted to engage a frame as described herein.

According to an additional aspect of the present invention, there is provided a temporary heat resistant cover sheet adapted to at least partially cover an electric heating wire of an electric sealer. The temporary heat resistant cover sheet is removable from the electric heating wire without damaging the electric heating wire.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
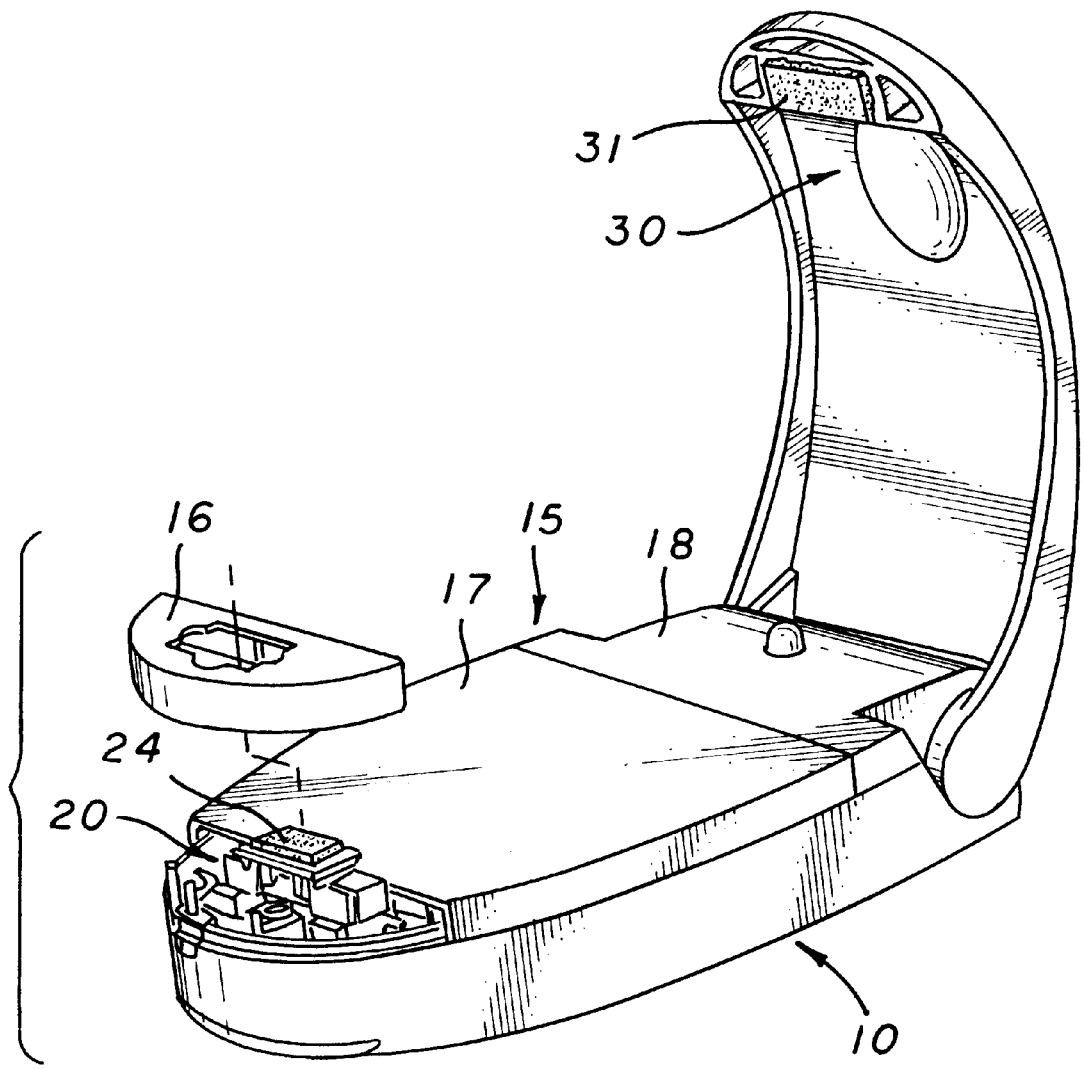
FIG. 1 is a perspective view of a hand-held electrical sealer according to the present invention.
Figure 2:
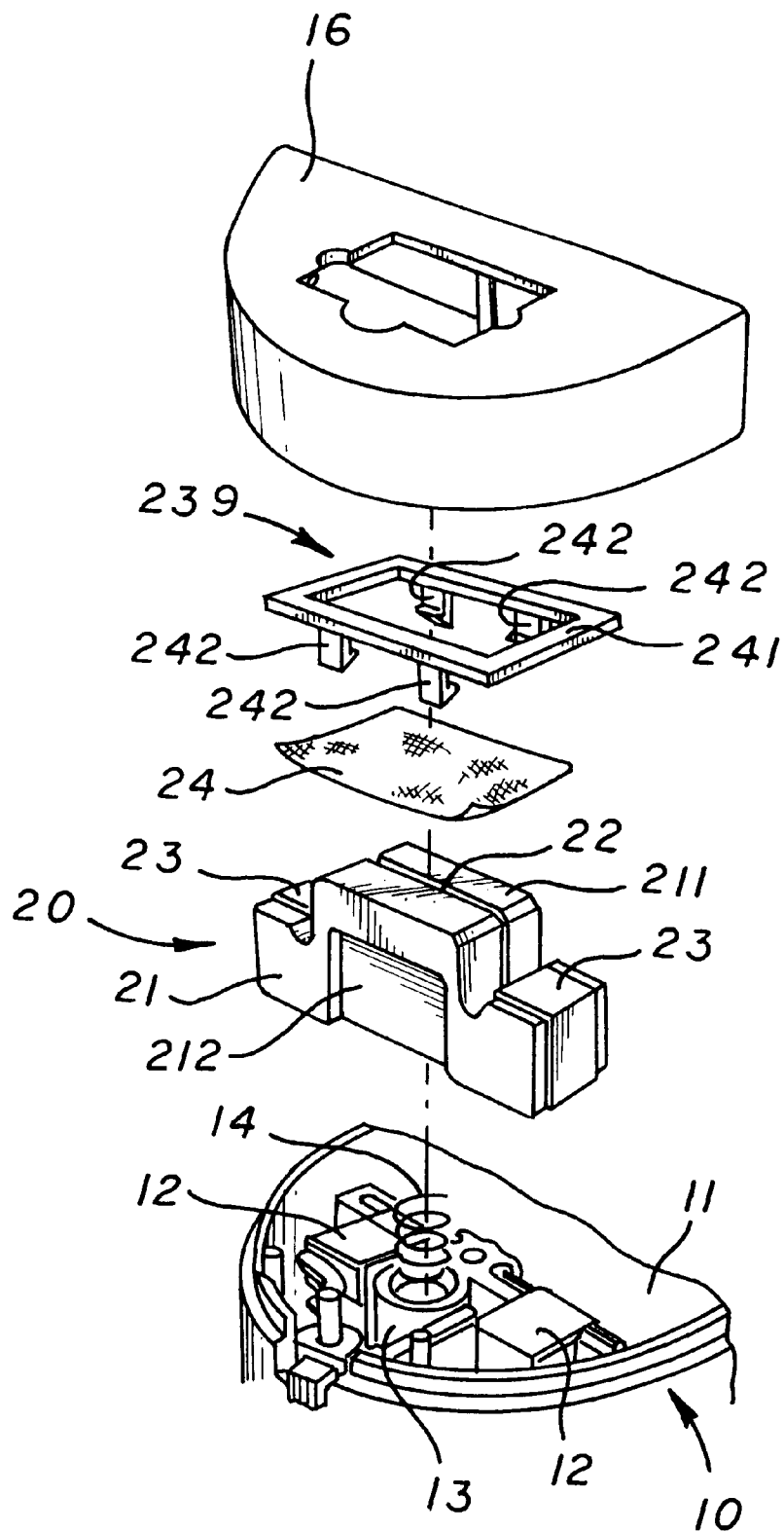
FIG. 2 is an exploded view of the heating unit for the hand-held electrical sealer according to the present invention.

Referring to FIGS. 1 and 2, a first embodiment of a hand-held electric heat sealer in accordance with the present invention generally includes a housing 10, a heating unit 20, and a press unit 30.

The housing 10 includes a receiving chamber 11 which receives the heating unit 20 and battery (not shown), a pair of metal contact plates 12 mounted in the receiving chamber 11 at one end for contact with the battery, a spring holder 13 mounted in the receiving chamber 11 between the metal contact plates 12, and a compression spring 14 supported in the spring holder 13. The housing also includes a cover unit 15 that covers the receiving chamber 11. The cover unit 15 includes a front cover plate 16, an intermediate cover plate 17, and a rear cover plate 18.

Figure 8:
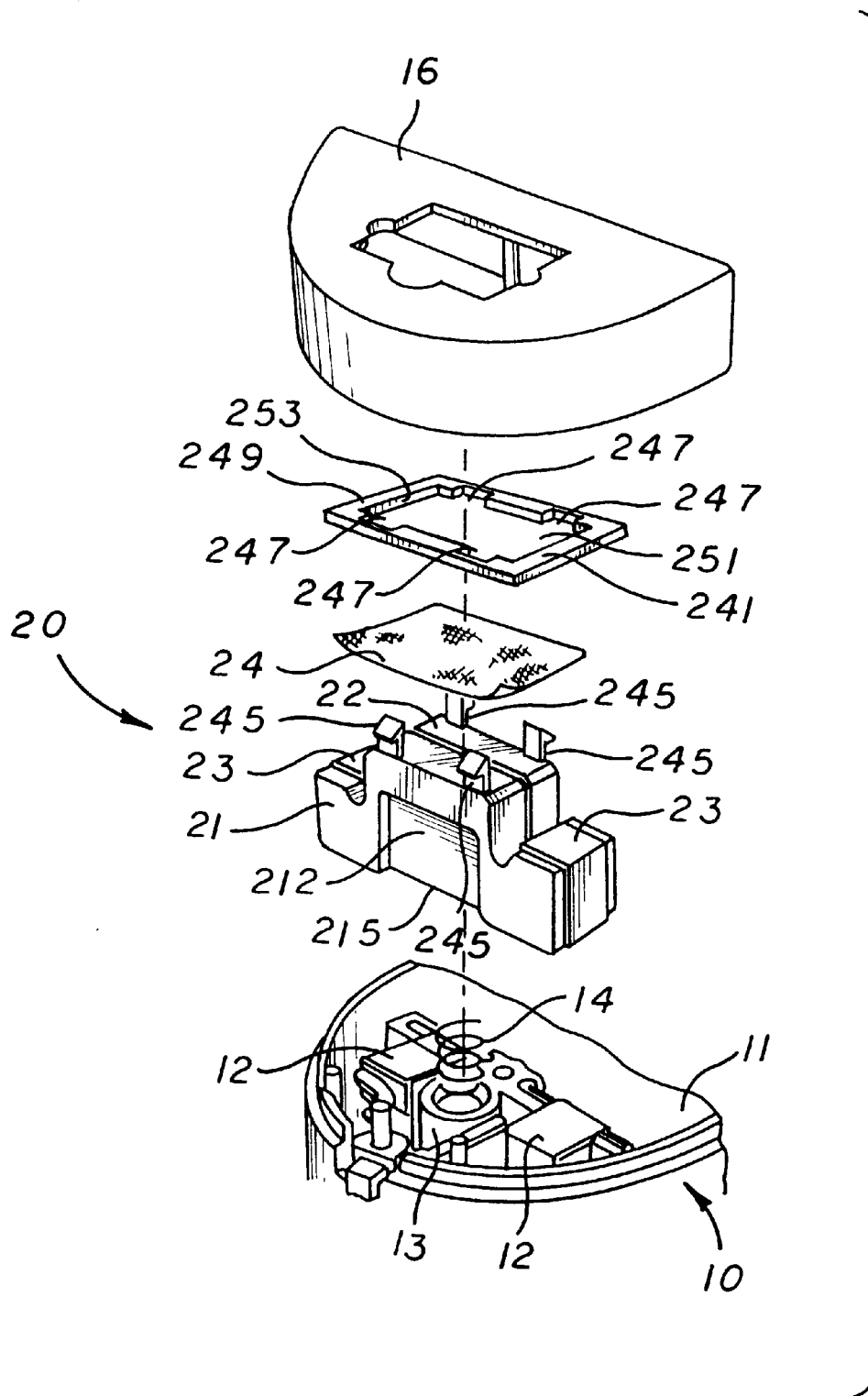
FIG. 8 is an exploded view of the heating unit of the electric heat sealer in accordance with an alternative embodiment of the present invention.

The heating unit 20 includes a heat insulative base 21, an electric heating wire 22, a pair of metal locating plates 23, a heat resistant cover sheet 24, and a frame 241. The heat resistant cover sheet 24 is held within the frame 241. The heat insulative base 21 includes a protrusive portion 211 in the middle, two coupling recessed portions 212 at two opposite lateral sides, and opposite bottom edges 215. The metal locating plates 23 are fastened to the heat insulative base 21 at two opposite locations. The electric heating wire 22 is mounted on the protrusive portion 211 of the heat insulative base 21, and secured in place by the metal locating plates 23. The frame 241 is mounted around the protrusive portion 211 of the heat insulative base 21 to hold down the heat resistant cover sheet 24 on the protrusive portion 211 over the electric heating wire 22. The frame 241 includes a top portion 249 having defined therein an opening 251 and a plurality of downwardly extending hooks 242. The frame 241 is secured to the heat insulative base 21 by engaging the hooks 242 in the coupling recessed portions 212. In an alternative embodiment, the heat insulative base 21 includes a plurality of upwardly extending hooks 245. In this embodiment, the frame 241 is secured to the heat insulative base 21 by engaging the hooks 245 in a plurality of recesses 247 located on the interior edge 253 of the frame top portion 249 of the frame 241 as shown in FIG. 8. It will be understood that the frame 241 can be secured to the heat insulating base 21 in a number of different ways. For example, threaded fasteners or snaps can be provided, the frame may be threaded, the frame may be hinged to the housing, the frame may be integral with the housing. Any method of securing the frame 241 to the heat insulating base is within the scope of the present invention. In the embodiment shown in FIG. 8, the heat insulative base preferably comprises a suitable plastic in particular a heat resistant plastic.

The heat resistant cover sheet 24 and the frame can be fastened together by directly molding the frame 241 on the heat resistant cover sheet 24 or by adhering the heat resistant cover sheet 24 to the frame 241 using an adhesive. The frame 241 is preferably comprised of a plastic, and can be directly molded on the heat resistant cover sheet 24 by injection molding.

The electric heating wire 22 can vary in thickness. Preferably, the thickness of the electric heating wire varies within the range of 0.10 mm to 0.50 mm. However, it will be understood that the electric heating wire 22 of the present invention can be any thickness.

Figure 7:
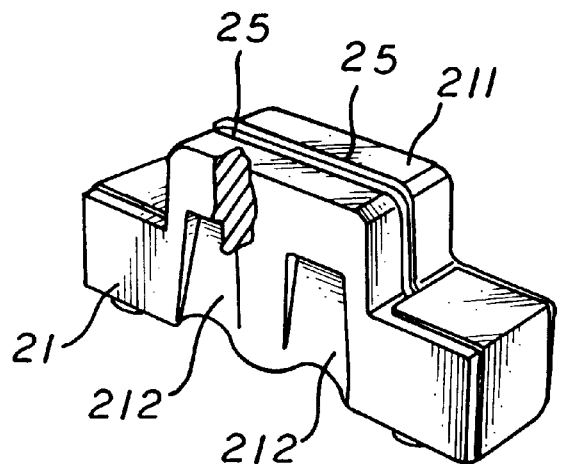
FIG. 7 shows multiple electric heating wires disposed on the heat insulative base of FIG. 3 according to the present invention.

In another preferred embodiment, as shown in FIG. 7, a plurality of electric heating wires 25 is employed. The electric heating wires 25 are mounted on the protrusive portion 211 of the heat insulative base 21, and secured in place by the metal locating plates 23. Any number of electric heating wires 25 is within the scope of the invention.

Referring to FIG. 1 again, the press unit 30 is pivotally connected to one end of the housing 10. The press unit 30 includes a heat insulative block 31. When the press unit 30 is pressed down, the heat insulative block 31 presses on the heat resistant cover sheet 24, and against the electric heating wire 22 and the protrusive portion 211 of the heat insulative base 21.

Figure 6:
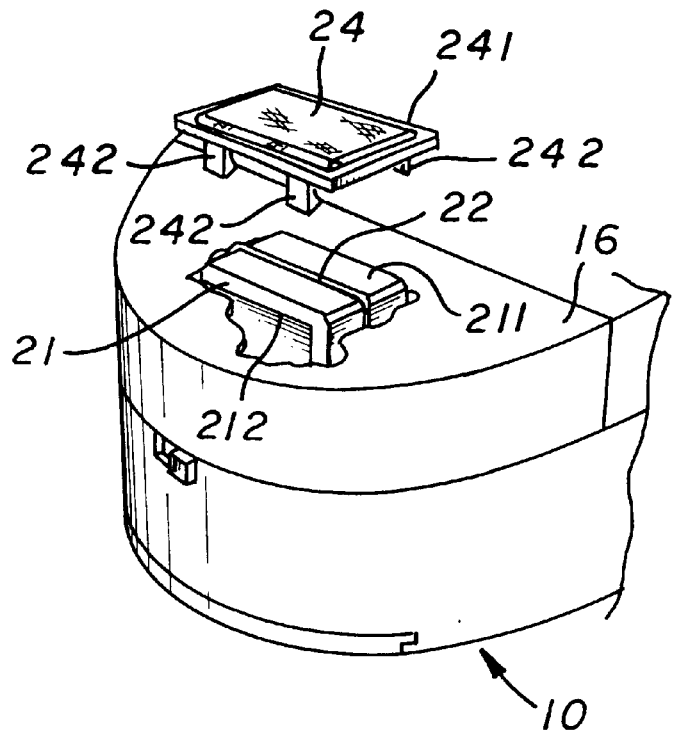
FIG. 6 is a schematic drawing explaining replacement of the heat resistant cover sheet.

Referring to FIG. 6, when replacing the heat resistant cover sheet, the downwardly extending hooks 242 of the frame 241 are disengaged from the heat insulative base 21. The used heat resistant cover sheet is then removed from the frame 241 and replaced with a new heat resistant cover sheet 24. The frame 241 is then fastened to the heat insulative base 21 to secure the new heat resistant cover sheet 24 to the protrusive portion 211 of the heat insulative base 21 and at least partially over the electric heating wire 22. Alternatively, when frame 241 is molded or adhered to cover sheet 24, thus forming a single unit, the entire unit can be removed and replaced with a new frame 241 and cover sheet 24.

Figure 3:
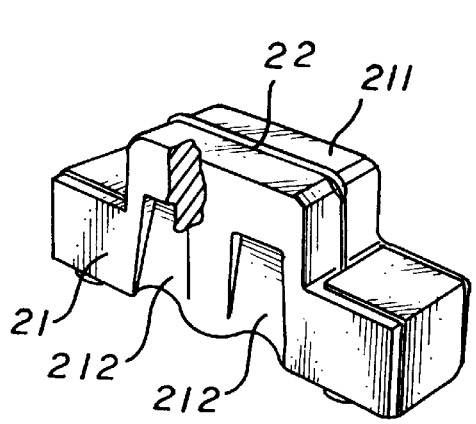
FIG. 3 shows an alternative form of the heat insulative base according to the present invention.
Figure 4:
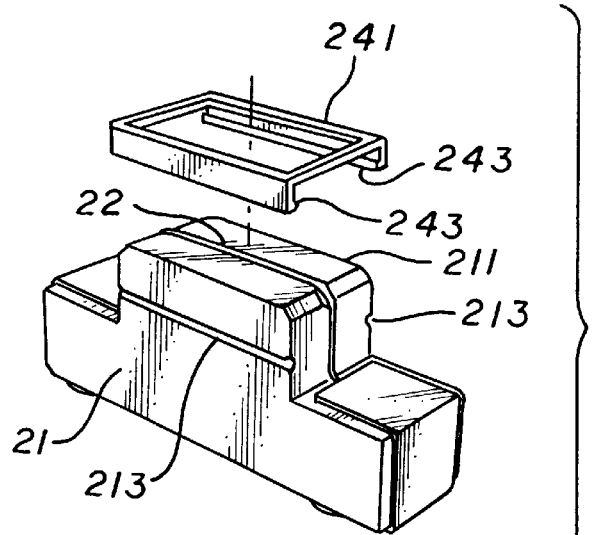
FIG. 4 shows an alternate form of the frame and another alternate form of the heat insulative base according to the present invention.
Figure 5:
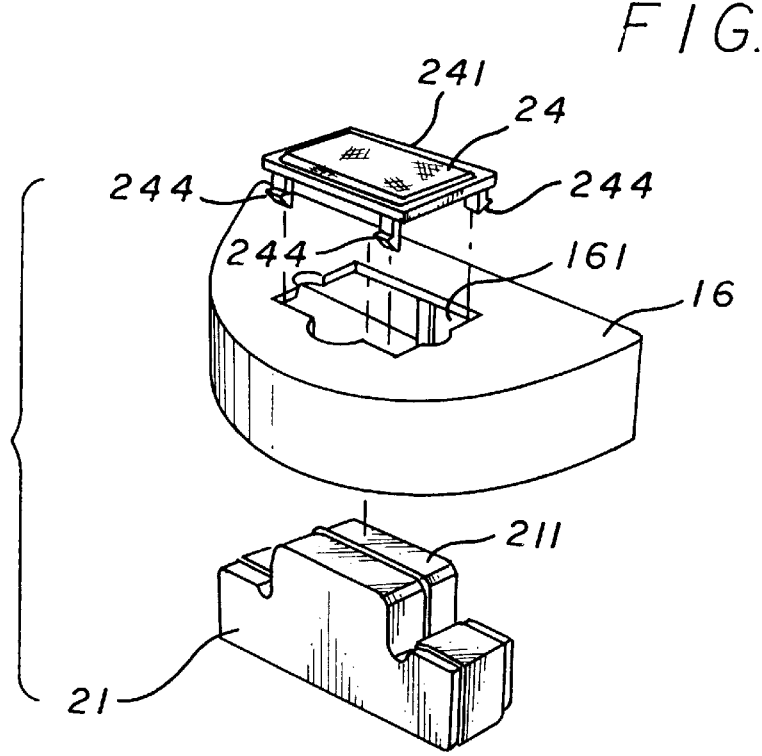
FIG. 5 shows another alternate form of the frame and its positioning on the front cover plate relative to the heat insulative base according to the present invention.

Referring to FIGS. 3 to 5, alternative embodiments of the heat insulative base 21 as well as the frame 241 are also included within the scope of the present invention. In FIG. 3, the heat insulative base 21 has two symmetrical pairs of coupling recessed portions 212 at two opposite sides for engagement with the downwardly extending hooks 242 of the frame 241. The heat resistant cover sheet 24 can be a meshed sheet member made from a heat resistant material, such as TEFLON® (polytetrafluoroethylene) or the like, that provides a smooth surface and protects the electric heating wire 22. In a preferred embodiment, the heat resistant cover sheet 24 is in the range of 5.0 mm to 9.0 mm wide and 8.0 mm to 12.0 mm long. However, it will be understood that the size of the heat resistant cover sheet 24 is not a limitation. Any width and length of the heat resistant cover sheet 24 are within the scope of the present invention.

Alternatively, the heat resistant cover sheet 24 can have an adhesive thereon for adhering the heat resistant cover sheet 24 to the electric heating wire 22 and the protrusive portion 211 of the heat insulative base 21. The adhesive can be a special adhesive that will not damage the electric heating wire 22 when the heat resistant cover sheet 24 is removed, thereby allowing the heat resistant cover sheet 24 to be temporary and replaceable.

In FIG. 4, the heat insulative base 21 includes two horizontal coupling grooves 213 at two opposite lateral sides. The frame 241 has two coupling flanges 243 for engaging the horizontal coupling grooves 213 of the heat insulative base 21.

In FIG. 5, the frame 241 has a plurality of downwardly extending hooks 244 respectively hooked in the peripheral edge of an opening 161 on the front cover plate 16.

According to an alternative embodiment, housing 10 has a continuous upper surface and a bottom plate, rather than a cover unit 15 including front cover plate 16 with opening 161. The upper surface of housing 10 has defined therein an opening through which protrusive portion 211 of heat insulative base 21 protrudes. Frame 241 engages the opening defined in the upper surface.

Although embodiments of the present invention which are hand-held heat sealers have been illustrated herein, the invention is not limited to such hand-held heat sealers. For example, the heat sealer need not be a hand-held heat sealer, but can be a table-mounted sealer. The heat sealer can also be a pen-type heat sealer, such as that described in U.S. Pat. No. 5,374,806, to Chou, which is incorporated herein in its entirety by reference. Thus, for example, the base 51 of the Chou '806 pen-type heat sealer, with at least one heating wire 52, can be provided with a frame 241 and a heat resistant cover sheet 24 as described herein rather than the protective cover layer 55 alone as disclosed in Chou '806.

What is claimed is:

1. A hand-held electric sealer comprising
   a) a housing,
   b) a heating unit mounted in said housing, said heating unit comprising
      i) a heat insulative base having a protrusive portion and
      ii) an electric heating wire mounted on said protrusive portion of said heat insulative base,
   c) a heat resistant cover sheet covering at least a portion of said electric heating wire, wherein said heat resistant cover sheet is held within a frame, said frame comprising retainer means that engage said protrusive portion of said heat insulative base to secure said heat resistant cover sheet to said protrusive portion and over at least said portion of said electric heating wire, and
   d) a press unit pivotally connected to said housing and acting against said heating unit.

2. The hand-held electric sealer of claim 1 wherein said heat insulative base has defined therein a plurality of recessed portions disposed on opposite sides of said protrusive portion, and wherein said retainer means of said frame comprises a plurality of downwardly extending hooks respectively engaged in said recessed portions of said heat insulative base.

3. The hand-held electric sealer of claim 1 wherein said heat resistant cover sheet is a meshed member made from TEFLON® a heat-resistant material.

4. The hand-held electric sealer of claim 1 wherein said frame is comprised of plastic and is molded on said heat resistant cover sheet.

5. A hand-held electric sealer comprising:
   a) a housing,
   b) a heating unit mounted within said housing, comprising
      i) a heat insulative base having a top and
      ii) an electric heating wire secured to said heat insulative base,
   c) a frame,
   d) a heat resistant cover sheet removably secured to said top of said heat insulative base by said frame, and
   e) a press unit pivotally connected to said housing.

6. The hand-held electric sealer of claim 5 wherein said heat insulative base further comprises a protrusive portion on which is secured said electric heating wire.

7. The hand-held electric sealer of claim 5 wherein said frame comprises a plurality of downwardly extending hooks for removably securing said frame to said heat insulative base, whereby said heat resistant cover sheet can be removed and replaced.

8. The hand-held electric sealer of claim 5 wherein said electric heating wire ranges in thickness from 0.10 mm to 0.50 mm.

9. An electric sealer comprising
   a) a housing,
   b) a heating unit mounted within said housing,
   c) a frame having defined therein an opening having an edge, said opening aligned with at least a portion of said heating unit,
   d) a heat resistant cover sheet aligned with at least a portion of said opening in said frame, and
   e) a press unit pivotally connected to said housing.

10. The sealer of claim 9 which is a hand-held electric sealer.

11. The sealer of claim 9 wherein said frame engages said heating unit.

12. The sealer of claim 11 wherein said heating unit comprises a heat insulative base having a protrusive portion, opposite sides and opposite bottom edges and wherein said frame and said protrusive portion of said heating unit engage.

13. The sealer of claim 12 wherein said frame comprises retainer means for engaging said frame with said protrusive portion of said heating unit and said heating unit has defined therein a plurality of openings within which said engaging retaining means engage.

14. The sealer of claim 13 wherein said retainer means comprise a plurality of downwardly extending hooks and said openings comprise a plurality of recessed portions defined in said opposite sides of said protrusive portion of said heating unit.

15. The sealer of claim 11 wherein said frame secures said heat resistant cover sheet to said heating unit.

16. The sealer of claim 9 wherein said heat resistant cover sheet is detachably affixed to said frame.

17. The sealer of claim 9 wherein said heat resistant cover sheet is permanently affixed to said frame.

18. A heat sealing kit comprising
   a) the sealer of claim 9 and
   b) at least one additional heat resistant cover sheet.

19. A method of servicing an electric sealer, said sealer comprising
   a) a housing,
   b) a heating unit mounted within said housing,
   c) a frame having defined therein an opening having an edge, said opening aligned with at least a portion of said heating unit, and
   d) a heat resistant cover sheet aligned with at least a portion of said opening in said frame,
   said method comprising the steps of
      i) removing said frame from said sealer,
      ii) replacing said heat resistant cover sheet with another heat resistant cover sheet, and
      iii) returning said frame to said sealer.

20. A method of servicing an electric sealer comprising a heating unit and a heat resistant cover sheet secured thereto, said method comprising the steps of
   i) removing said heat resistant cover sheet from said heating unit and
   ii) replacing said cover sheet so removed with another heat resistant cover sheet.

21. A frame for removably securing a heat resistant cover sheet to a heating unit of an electric sealer, said frame comprising:
   a) a top portion having an opening defined therein, said opening being adapted to align with at least a portion of said heating unit, and
   b) retainer means connected to said top portion for engaging said heating unit.

22. The frame of claim 21 wherein said retaining means comprises a plurality of downwardly extending hooks.

23. The frame of claim 21 further comprising a heat resistant cover sheet affixed to said top portion.

24. The frame of claim 21 in combination with an electric sealer.

* * * * *